United States Patent [19]

Ercole et al.

[11] Patent Number: 5,625,959
[45] Date of Patent: May 6, 1997

[54] RECONFIGURABLE SUPPORTING FIXTURE, PARTICULARLY FOR MEASURING MACHINES, AND RELATIVE CONFIGURATION METHOD

[75] Inventors: Maurizio Ercole, Turin; Pasqualino Poggi, Moncalieri, both of Italy

[73] Assignee: Dea-Brown & Sharpe S.p.A., Turin, Italy

[21] Appl. No.: 408,142

[22] Filed: Mar. 20, 1995

[30] Foreign Application Priority Data

Mar. 22, 1994 [IT] Italy .................. TO94A0209

[51] Int. Cl.⁶ .................................. B23Q 16/00
[52] U.S. Cl. .................................. 33/568; 33/573
[58] Field of Search ............... 33/503, 568, 569, 33/570, 573; 269/24, 71, 309, 900

[56] References Cited

U.S. PATENT DOCUMENTS

| | | | |
|---|---|---|---|
| 4,184,669 | 1/1980 | Bald | 269/309 |
| 4,641,819 | 2/1987 | Poland | 269/71 |
| 4,667,922 | 5/1987 | Cutgurth | 248/664 |
| 4,834,358 | 5/1989 | Okolischan et al. | 269/309 |
| 4,848,005 | 7/1989 | Ercole | 33/568 |
| 5,026,033 | 6/1991 | Roxy | 269/71 |
| 5,107,599 | 4/1992 | Marinci et al. | 33/573 |
| 5,163,793 | 11/1992 | Martinez | 269/309 |
| 5,190,273 | 3/1993 | Salvangini | 269/309 |
| 5,192,058 | 3/1993 | VanDalsem et al. | 269/24 |

FOREIGN PATENT DOCUMENTS 0316261  5/1989  European Pat. Off. .

Primary Examiner—Thomas B. Will
Attorney, Agent, or Firm—Ladas & Parry

[57] ABSTRACT

A fixture for positioning and supporting parts for measurement on a measuring machine, the fixture presenting a number of reconfigurable supporting elements, each presenting a first portion positionable on the reference surface of the machine, and a second portion positionable in relation to the first portion in a direction perpendicular to the reference surface; and a reference tool positioned automatically by the machine, and presenting a three-dimensional reference for the second portion of the supporting elements; the supporting elements being moved manually over the reference surface so that the second portion contacts the reference tool, and being clamped in the position so defined.

21 Claims, 6 Drawing Sheets

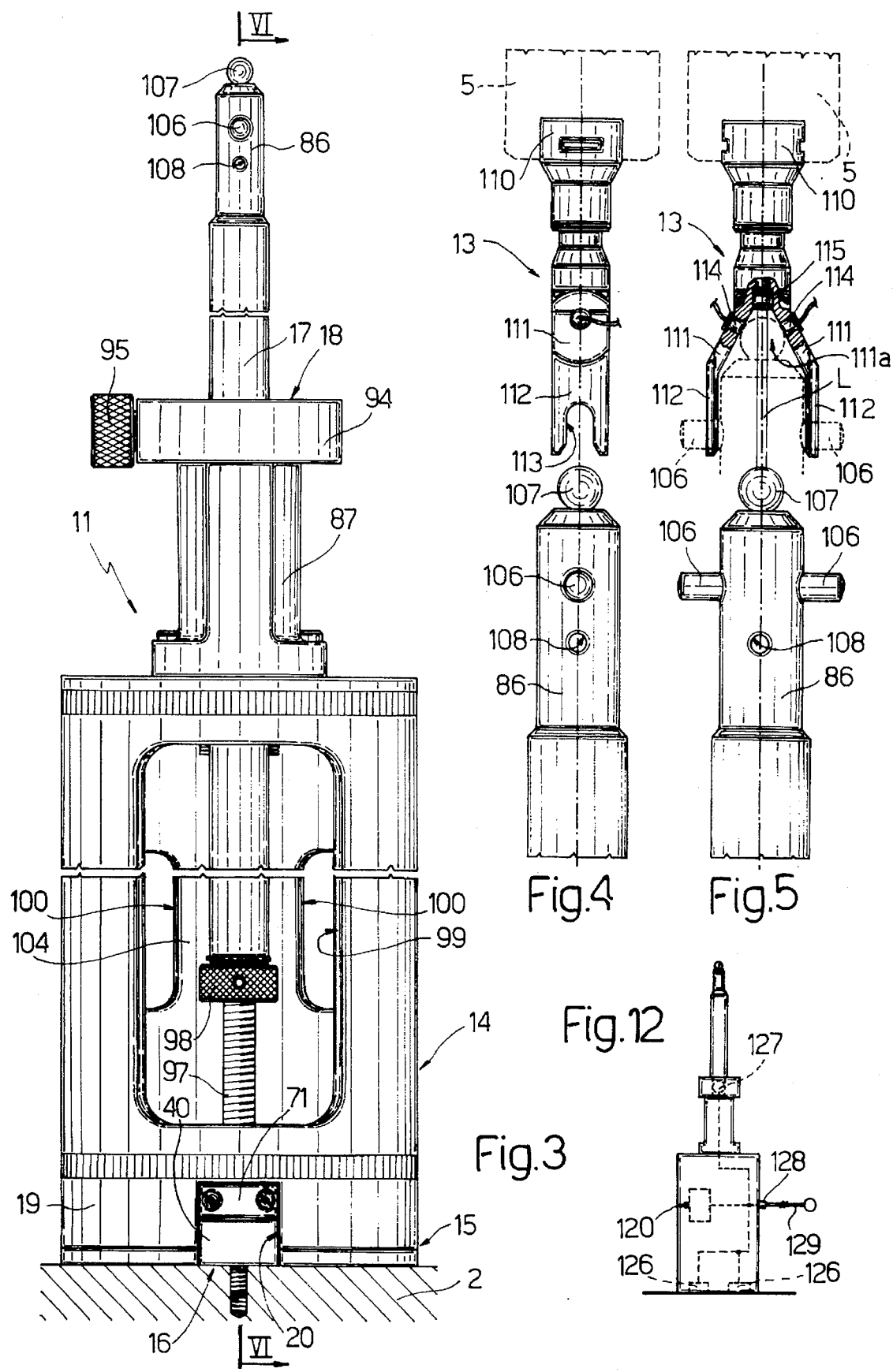

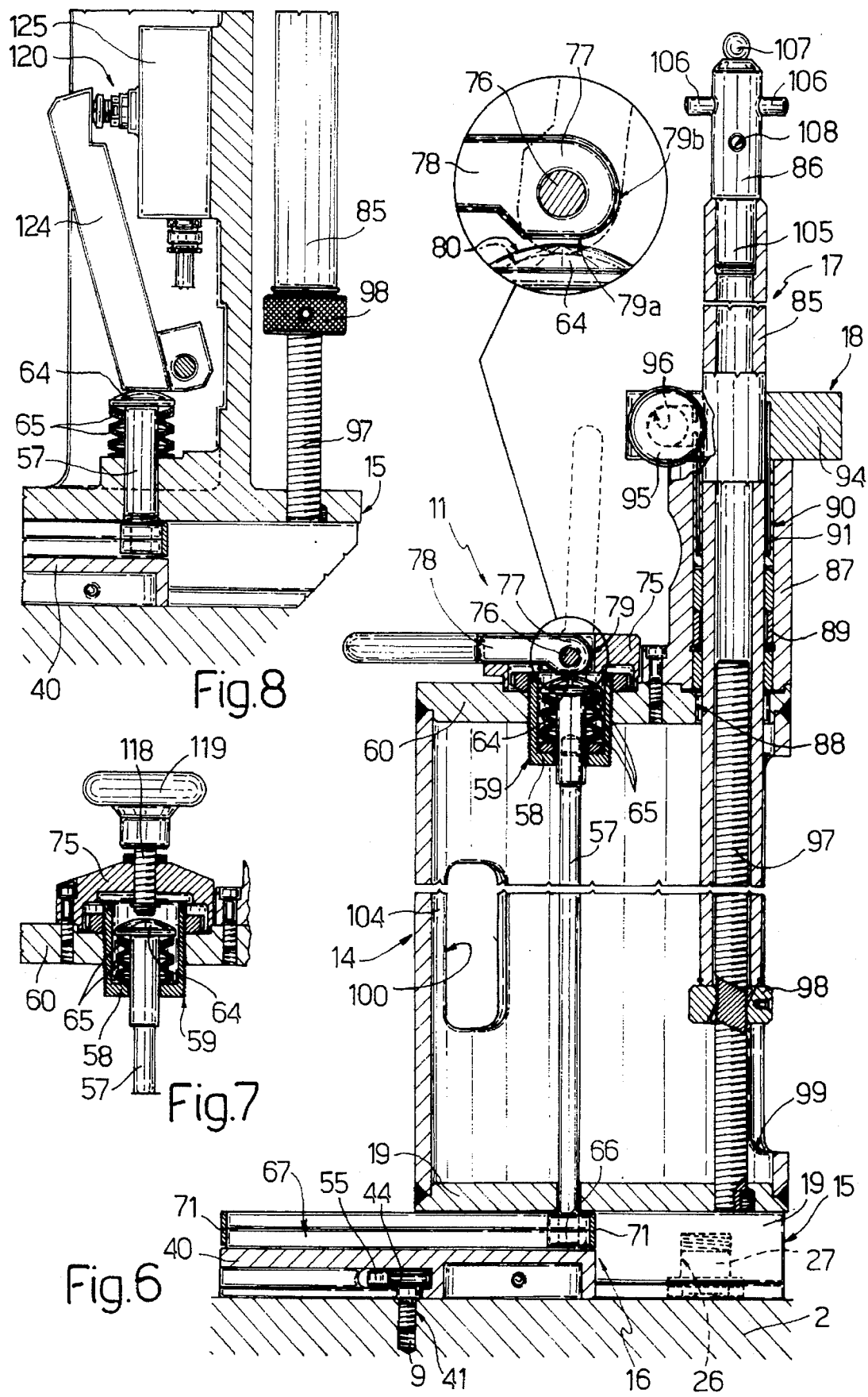

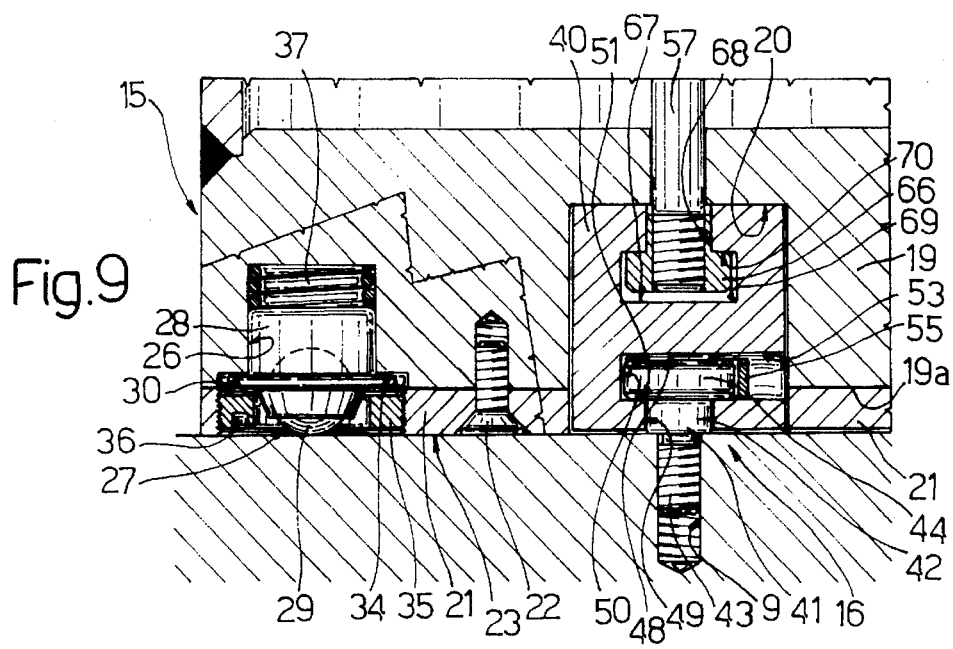
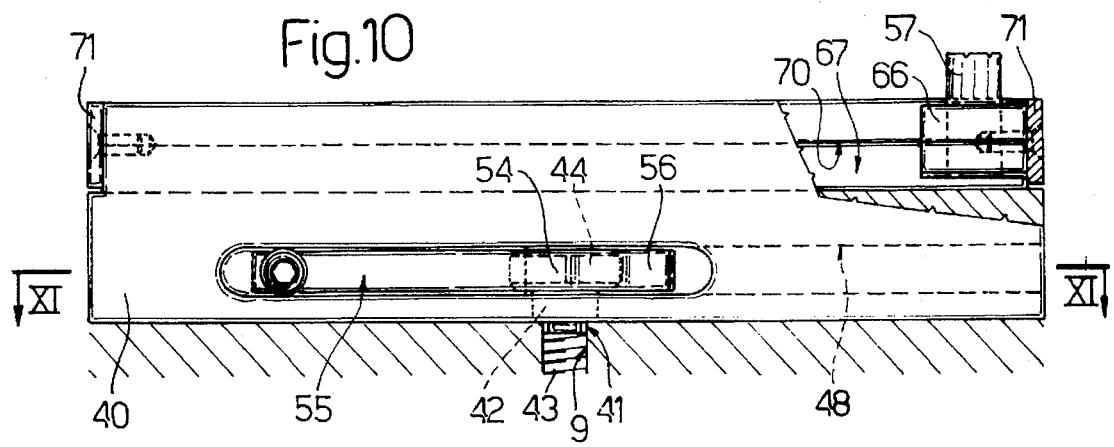
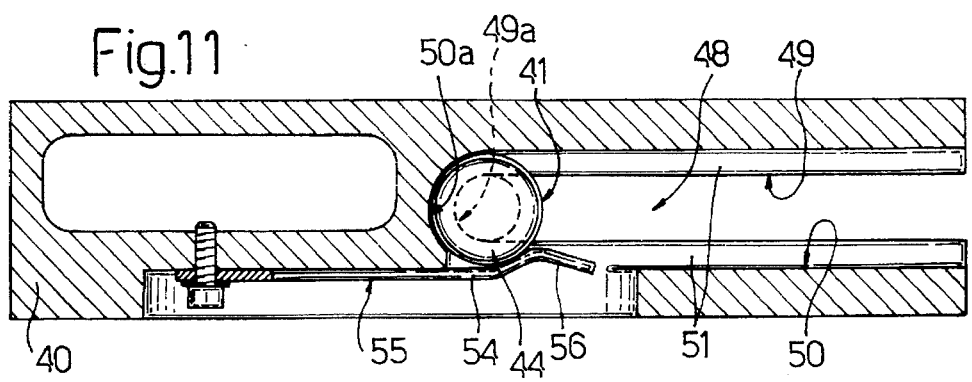

RECONFIGURABLE SUPPORTING FIXTURE, PARTICULARLY FOR MEASURING MACHINES, AND RELATIVE CONFIGURATION METHOD

BACKGROUND OF THE INVENTION

The present invention relates to a reconfigurable part supporting and positioning fixture, particularly, but not exclusively, for machine-measured parts.

In the following description, specific reference is made to the above application purely by way of example.

As is known, for measuring parts on a measuring machine, the parts are positioned and secured to the machine bed by means of supporting fixtures. These are normally special-purpose types and, particularly in the case of parts deformable under their own weight, such as certain vehicle body components, are relatively complex and expensive by having to reproduce the in-service restraint conditions of the part.

As an alternative to traditional special-purpose fixtures, to reduce retooling cost for measuring different parts, reconfigurable fixtures have been devised, as described for example in Italian Patent n. 1.206.886 filed by the present Applicant.

Briefly, such fixtures consist of a number of column type supporting elements substantially comprising a base secured in a predetermined position to the reference surface, e.g. by means of magnetic stops, and a rod adjustable in height along an axis perpendicular to the reference surface. Both positioning of the base and the height adjustment of the rod are performed automatically by the measuring machine itself, the head of which is equipped with a gripping tool cooperating with the column elements.

Though highly effective, known reconfigurable fixtures of the above type present several drawbacks. First and foremost is the high cost involved, mainly due to the complex mechanical design and circuitry of the column elements and gripping tool for rendering the fixture fully automatic.

Secondly, as the base is supported pneumostatically on the reference surface, whereas it is locked in any position magnetically, the reference surface of the machine must be made of ferromagnetic material with none of the holes normally provided on conventional machines, which means fixtures of the above type cannot be used on conventional machines of all types.

SUMMARY OF THE INVENTION

It is an object of the present invention to provide a reconfigurable part supporting fixture, particularly for measuring machines, designed to overcome the aforementioned drawbacks typically associated with known fixtures.

According to the present invention, there is provided a reconfigurable fixture for positioning and supporting parts on a machine, particularly a measuring machine, comprising a reference surface and a movable unit; said fixture comprising at least one reconfigurable supporting element presenting a first portion positionable on said surface, and a second portion positionable in relation to said first portion and in a direction perpendicular to said surface;

said fixture being characterized in that it comprises a reference tool movable by said movable unit into a predetermined position and presenting three-dimensional reference means cooperating with said second portion of said supporting element in a position of mutual engagement; and clamping means activated in said position of mutual engagement, for clamping said first portion to said surface and said second portion in relation to said first portion.

The present invention also relates to a method of configuring a fixture for positioning and supporting parts on a machine, particularly a measuring machine, comprising a reference surface and a movable unit; said fixture comprising at least one reconfigurable supporting element presenting a first portion positionable on said surface, and a second portion positionable in relation to said first portion in a direction perpendicular to said surface;

said method being characterized in that it comprises a first step wherein a reference tool is positioned by said movable unit in a predetermined position; a second step wherein said first portion of said supporting element is moved manually on said surface, and said second portion of said supporting element is moved manually in relation to said first portion, so that said second portion of said supporting element engages three-dimensional reference means of said reference tool; and a third step wherein said first portion is clamped to said surface, and said second portion is clamped in relation to said first portion in said engaged position.

BRIEF DESCRIPTION OF THE DRAWINGS

A preferred, non-limiting embodiment of the present invention will be described by way of example with reference to the accompanying drawings, in which:

FIG. 3 shows a front view of the FIG. 2 column element secured to the measuring machine work surface;

FIGS. 4 and 5 show partial front and side views respectively of the top end of the column element and a respective positioning tool of the measuring machine;

FIG. 6 shows a section along line VI—VI in FIG. 3;

FIGS. 7 and 8 show partial sections of respective variations of a detail in FIG. 6;

FIG. 9 shows a partial section of the base of the FIG. 3 column, and a device for clamping the column to the measuring machine work surface;

FIG. 10 shows a side view of a detail of the FIG. 9 clamping device;

FIG. 11 shows a section along line XI—XI in FIG. 10;

FIG. 12 shows a smaller-scale schematic view of a variation of the FIG. 2 column element;

DETAILED DESCRIPTION OF THE INVENTION

Figure 1:
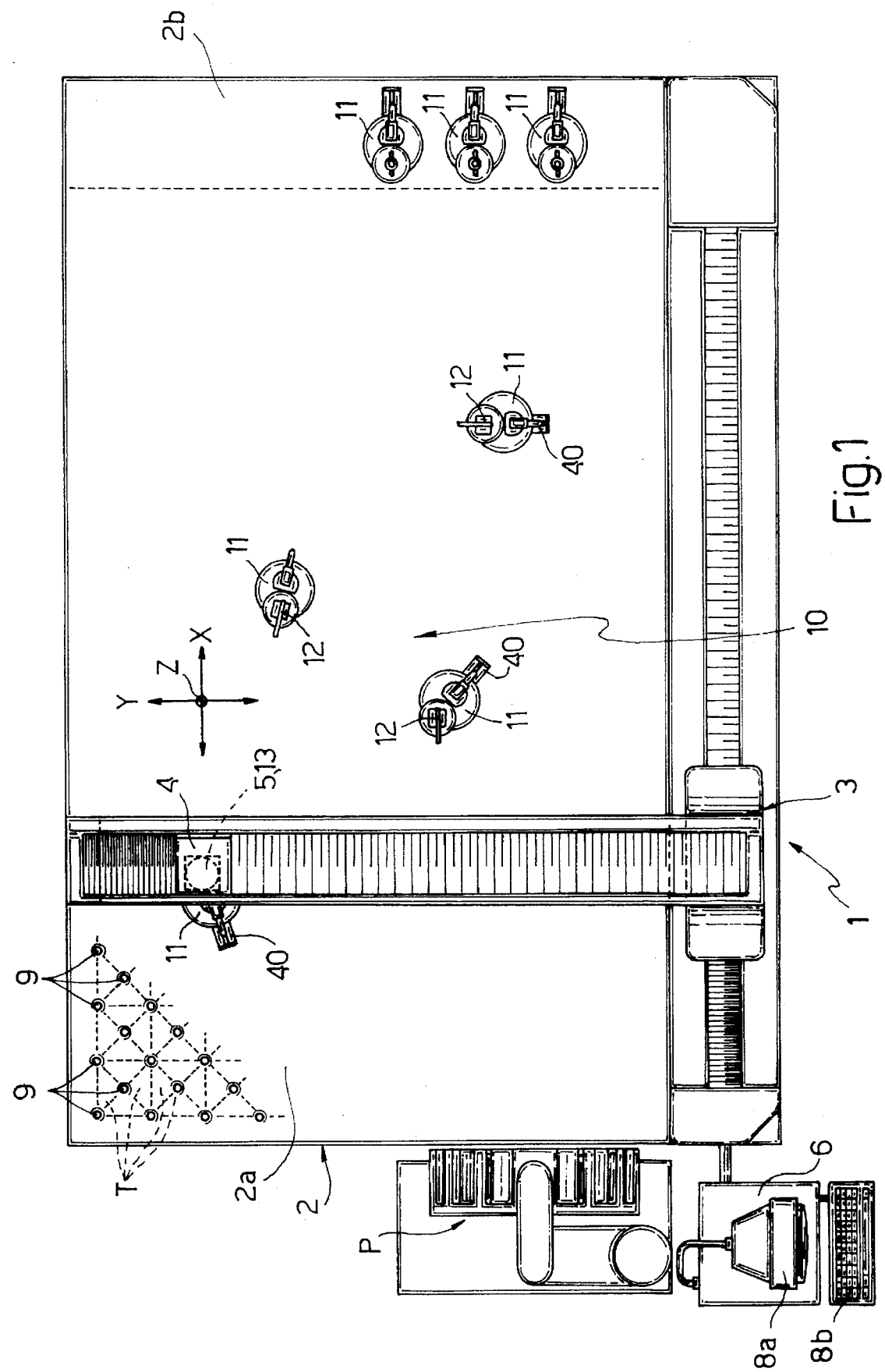
FIG. 1 shows a top plan view of a measuring machine featuring a reconfigurable fixture in accordance with the teachings of the present invention.

Number 1 in FIG. 1 indicates a known measuring machine comprising a bed 2; and a movable, e.g. gantry type, measuring unit 3 with a measuring head 4 presenting a tool spindle 5 and which is movable by unit 3 along three coordinate axes X, Y, Z. More specifically, the X and Y axes are horizontal, perpendicular to each other, and define an X,Y reference plane coincident with the flat top surface 2a of bed 2; while the Z axis is vertical and therefore perpendicular to the X,Y plane.

Machine 1 also comprises a processing and control unit 6 connected to unit 3, and which provides for controlling, in programmable operating cycles, displacement of the movable members of unit 3 along the X,Y,Z axes. Unit 6 conveniently presents a data input keyboard 8b, and a video terminal 8a for supplying operator information as described later on.

Machine 1 also conveniently comprises a tool store P located to the side of bed 2 and from which the tool (not shown) required for each measuring cycle is withdrawn by unit 3.

Bed 2 is made of any, even nonferromagnetic, material, and presents a number of threaded holes 9 (only a few of which are shown) equally spaced in an orderly arrangement on top surface 2a. For example, holes 9 may form the vertices of a number of adjacent right isosceles triangles T covering surface 2a, so that, with the exception of the holes in the outermost rows, each hole is located at the center of a square, the vertices of which are formed by the four surrounding holes.

If bed 2 is made of nonmetal material, e.g. granite, holes 9 are conveniently formed in metal inserts (not shown) housed inside the bed.

According to the present invention, machine 1 is provided with a reconfigurable fixture 10 for supporting the parts being measured.

Fixture 10 comprises a number of column type supporting elements 11 (hereinafter referred to simply as "columns") which are adjustable in height and clamped in appropriate positions to bed 2; a number of supporting tools 12 which are fitted to each column 11 for supporting and/or clamping the part; and a positioning tool 13 which is fitted to spindle 5 of measuring head 4 to define a position reference for configuring columns 11 as described in detail later on.

FIGS. 3 and 6 show one of columns 11, the following description of which also applies to the others which are obviously identical.

Column 11 substantially comprises a hollow cylindrical body 14 with a base 15 cooperating with bed 2; a device 16 for clamping body 14 to bed 2; a vertical rod 17 housed partly and supported inside body 14 in axially sliding manner to adjust the overall height of column 11; and a device 18 for clamping rod 17 in a predetermined axial position.

Base 15 comprises a relatively thick, circular plate 19, the bottom face 19a of which presents a rectangular-section groove 20 (FIG. 9).

Figure 2:
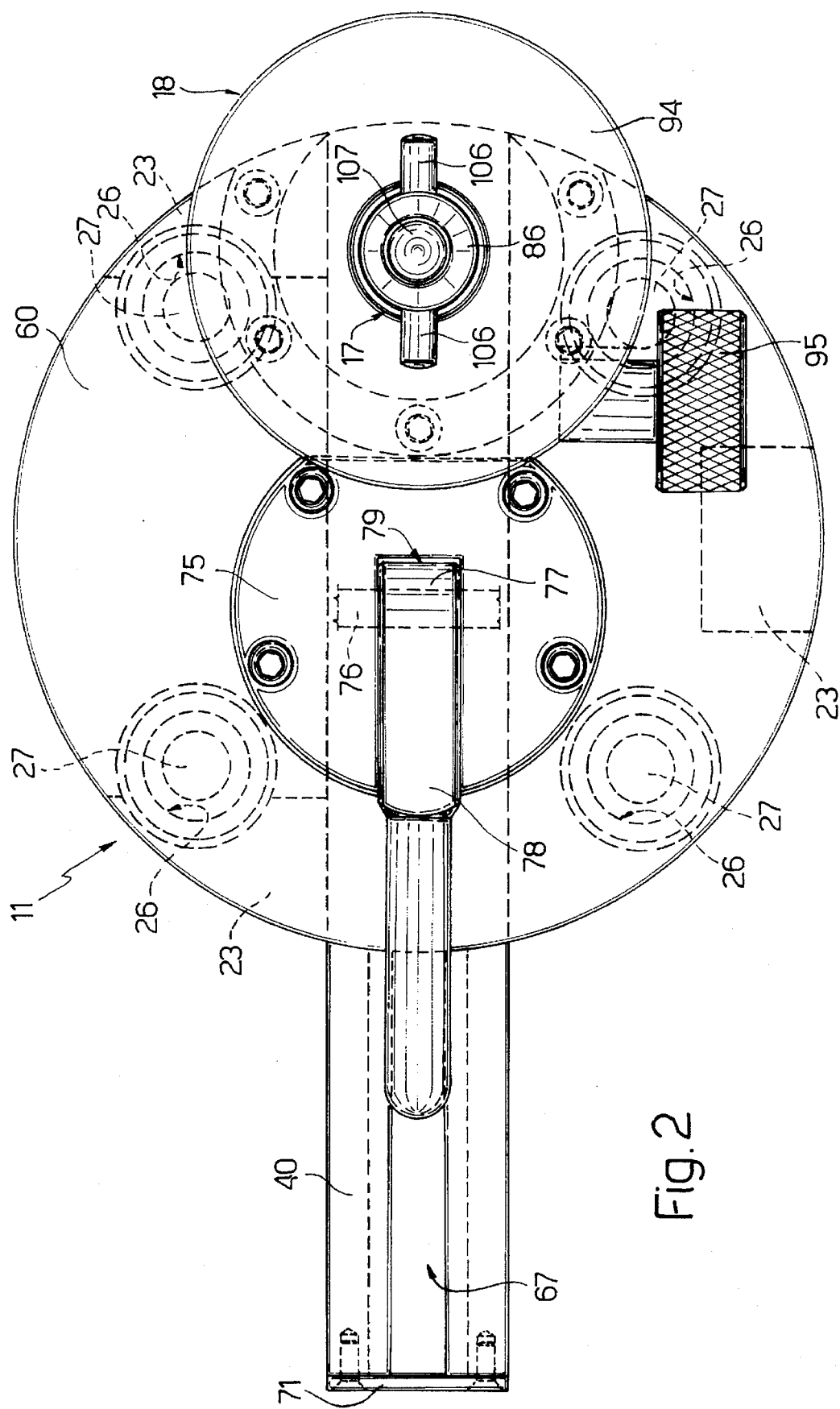
FIG. 2 shows a top plan view of a column element of the fixture according to the present invention.

On either side of groove 20, bottom face 19a of plate 19 is fitted, by means of a number of tap screws 22, with two plates 21 in the form of a segment of a circle (FIG. 9); which plates 21 together define three projecting, peripheral portions 23 (FIG. 2) substantially equally spaced angularly and which form an isostatic support for base 15 on bed 2.

Plate 19 presents two pairs of cylindrical seats 26 located symmetrically on either side of groove 20 (FIGS. 2 and 9); and each seat 26 houses in sliding manner a ball support 27 comprising a bush 28, and a ball 29 projecting partly downwards from and housed in freely rotating manner in bush 28. Bush 28 presents an annular flange 30 fitted in axially slack manner between a shoulder 34, defined by plate 19, and a ring nut 35 screwed inside a hole 36 formed in respective plate 21 and facing seat 26.

Ball supports 27 are loaded downwards by respective springs 37 housed in seats 26, and exert a sufficient elastic force to overcome the weight of column 11 which, when clamping device 16 is released, is therefore supported on bed 2 solely by means of balls 27, and can therefore be moved over bed 2 with very little rolling friction.

Clamping device 16 (FIGS. 6 and 9–11) comprises an elongated-parallelepipedon-shaped gib 40 housed in sliding manner inside groove 20 of base 15 and which snaps on to an anchoring element 41 fitted to bed 2. More specifically, element 41 is substantially mushroom-shaped, and presents a head 44, and a shank 42, the threaded end 43 of which screws into one of holes 9 in bed 2.

Gib 40 presents a longitudinal T-section bottom groove 48 (FIG. 11) extending from one end and along substantially half the length of the gib; which groove 48 presents a surface portion 49 engaged in sliding manner by shank 42 of element 41, and an inner portion 50 wider than portion 49, forming shoulders 51 with portion 49, and designed to receive head 44 of element 41. Both portions 49 and 50 of groove 48 are defined axially, in the central portion of gib 40, by respective semicylindrical concave stop surfaces 49a, 50a.

Gib 40 also presents a longitudinal lateral groove 53, the end portion of which communicates with inner portion 50 of groove 48 via an opening 54. The bottom of groove 53 is fitted with a spring 55 projecting towards opening 54 where it presents a half-wave-shaped end 56 with its convexity facing groove 48 and which snaps on to head 44 of element 41 (FIG. 11).

Clamping device 16 also comprises a vertical tie 57 housed inside body 14 of column 11 for the purpose described later on. As shown in FIG. 6, tie 57 is fitted through the bottom wall 58 of a cup-shaped body 59 fitted to the top wall 60 of body 14, and presents a top end head 64 housed in sliding manner inside body 59. A number of Belleville washers 65 are interposed between head 64 and bottom wall 58, and tie 57 also presents a bottom end head 66 by which it is secured axially to gib 40.

For this purpose, gib 40 presents a longitudinal, inverted-T-section top groove 67 (FIGS. 9, 10) extending along the full length of the gib, and presenting a surface portion 68, and a bottom portion 69 wider than and forming shoulders 70 with portion 68. The T-section head 66 of tie 57 is housed prismatically inside groove 67 and cooperates axially with shoulders 70 by virtue of the load exerted by washers 65. The axial ends of groove 67 are closed by a pair of plates 71 fitted to gib 40, for preventing longitudinal withdrawal of head 66 of tie 57.

Top wall 60 of body 14 is fitted with a cover 75 (FIG. 6) for closing the top of cup-shaped body 59, and on which the end 77 of a lever 78 for releasing device 16 pivots by means of a horizontal pin 76. End 77 presents a cam profile 79 cooperating with the spherical-bowl-shaped top surface 80 of head 64 of tie 57.

As shown in the enlarged detail in FIG. 6, cam profile 79 presents a flat portion 79a facing head 64 when lever 78 is lowered, and enabling tie 57 to be raised by washers 65 so as to cooperate axially with gib 40; and a maximum-eccentricity portion 79b cooperating with head 64 when lever 78 is raised (as shown by the dotted line) so as to push tie 57 downwards in opposition to washers 65, and so detach head 66 from shoulders 70 to release gib 40.

Rod 17 of column 11 comprises a vertical tubular rod 85; and an end supporting and positioning element 86 (described later on) fitted to the top end of rod 85. Rod 85 is fitted through a tubular sleeve 87 in turn fitted to top wall 60 of body 14 at a peripheral hole 88 formed in wall 60, and is supported radially and in axially free manner inside sleeve 87 by a sliding bearing 89.

Device 18, for clamping rod 17 in a given axial position, conveniently comprises a known radially-expanding bush in turn comprising a cylindrical portion 90 interposed between the top end of sleeve 87 and rod 85, and consisting in known manner of a pair of coaxial, elastically deformable walls radially defining an annular cavity 91 containing substantially noncompressible fluid. Bush 18 also presents a radial end flange 94 in which is screwed a knob 95 for controlling displacement of a piston (not shown) in a chamber 96 communicating with cavity 91.

A threaded bar 97, fitted by its bottom end to base 15, extends, coaxially with rod 85, inside and along the full height of body 14, and preferably inside sliding bearing 89, and is fitted with a known fast-sliding ring nut 98 (not described in detail) cooperating axially with rod 85 to define an additional axial safety stop.

Body 14 (FIG. 3) conveniently presents a lateral opening 99 facing bar 97 and extending almost the full height of body 14, for enabling access to ring nut 98; and a further pair of lateral openings 100 in body 14 define a lateral portion 104 of body 14, diametrically opposite opening 99 and forming a handgrip whereby to move column 11 easily.

Supporting and positioning element 86 of rod 17 is substantially cylindrical, and presents a small-diameter bottom portion 105 (FIG. 6) fitted rigidly inside the top end of rod 85. Element 86 presents a pair of diametrically opposed, radial projections 106 (FIG. 5) conveniently consisting of the opposite ends of a single diametrical pin, and is fitted integral with a ball 107 on its top end face.

Element 86 also presents two diametrical through holes 108 (FIGS. 4, 5) intersecting perpendicularly and for enabling fast assembly of supporting tools 12 (FIG. 1). Tools 12 and the manner in which they are fitted to rod 17 are described in Italian Patent n. 1206886 filed by the present Applicant, and the content of which is included herein purely by way of reference as required.

The position of column 11 on bed 2 and the axial position of rod 17 are defined with reference to tool 13 which is fitted to spindle 5 (FIGS. 4, 5) of movable unit 3.

Tool 13 is interchangeable in relation to the measuring tools of machine 1, and is withdrawn from (or replaced in) tool store P automatically.

Tool 13 presents a shank 110 for connection to spindle 5, and from which project two diverging arms 111 defining a V-shaped seat 111a and terminating in respective end forks 112 parallel to each other and to the tool axis. Forks 112 present respective longitudinal end slots 113 which are engaged in sliding manner by respective projections 106 on element 86 of rod 17 to define the angular position of rod 17, and also to define a restraint for column 11 in the horizontal direction crosswise to the axis of projections 106. Arms 111 cooperate with ball 107 of rod 17 to define the position of rod 17 vertically and in the horizontal direction parallel to the axis of projections 106.

Tool 13 thus defines a three-dimensional position reference for rod 17.

Arms 111 conveniently present respective electric contacts 114 connected to a normally-open signaling circuit (not shown) which is closed by ball 107 when this is positioned correctly in relation to tool 13, and which comprises, for example, an acoustic or luminous contact indicator.

Finally, tool 13 presents a light source 115 located between arms 111, for emitting a beam L along the axis of tool 13.

Fixture 10 operates as follows.

When not in use, columns 11 are conveniently housed in a storage portion 2b located to the side of bed 2 and possibly presenting no anchoring holes 9.

In-service setup of fixture 10 involves positioning a given number of columns 11 in the X-Y plane, and adjusting the height of respective rods 17.

For each part to be measured, the operating sequences are memorized in control unit 6 which operates the movable unit so as to set tool 13 successively and in a predetermined order to the various reference positions for positioning each column 11. Unit 6 is also conveniently programmed to supply the operator, via video terminal 8a, with operating instructions relative, for example, to the location of the hole 9 to which each column 11 is to be secured.

Each column 11 is set up as follows.

Control unit 6 operates unit 3 so as to set tool 13 to the correct reference position for the column; at which point, light source 115 is activated to direct on to surface 2a a beam indicating the point, defined by the X,Y coordinates, at which the axis of rod 17 is to be located.

The operator then fits an anchoring element 41 inside a hole 9, which may be the closest to the point indicated by the light beam, or a different hole 9 as indicated on video terminal 8a, to prevent interference with other columns 11.

If not already released, clamping device 16 of column 11 is released by raising lever 78, so that tie 57 is pushed down to detach head 66 from shoulders 70 of top groove 67 of gib 40, and so enable gib 40 to slide longitudinally along groove 20.

Column 11 is then withdrawn manually from storage portion 2b and, conveniently gripping portion 104, is rolled over surface 2a on ball supports 27; column 11 is moved so that gib 40 engages anchoring element 41; and gib 40 is moved so that element 41 slides along bottom groove 48 into the limit position (FIGS. 6, 11) wherein spring 55 snaps on to and arrests element 41, and gib 40 is substantially hinged to and free to rotate about element 41.

Further continuous displacement of column 11 is only possible in a circular region about anchoring element 41 and according to a system of polar coordinates: gib 40 may rotate in relation to element 41, and column 11 slide along gib 40.

With the aid of the light beam, the operator then moves column 11 into a roughly correct X,Y position; rod 17 is released using knob 95 on bush 18, is raised towards tool 13, is rotated manually so that projections 106 engage slots 113 in forks 112 of tool 13, and is further raised so that ball 107 cooperates with arms 111 of tool 13, and in particular with contacts 114; the indicator circuit informs the operator, either acoustically or visually, that rod 17 is positioned correctly; the operator lowers lever 78 to clamp column 11 to the bed; and, with rod 17 maintained contacting tool 13, the operator then clamps rod 17 in relation to body 14 of column 11 using knob 95 on bush 18. The above clamping sequence may be inverted.

Column 11 is clamped to the bed by virtue of bottom head 66 of tie 57 contacting shoulders 70 of gib 40 when lever 78 is lowered, and by virtue of gib 40 being secured to bed 2 by anchoring element 41. As such, head 64 of tie 57 constitutes a fixed top support for washers 65; the elastic load of washers 65 is transmitted by cup-shaped element 59 to body 14 of column 11; and body 14 moves down in opposition to the elastic reaction of springs 37 of ball supports 27 so as to cooperate with surface 2a of bed 2 at supporting portions 23.

For added safety, in addition to clamping rod 17 by means of bush 18, ring nut 98 is slid rapidly into the clamping position almost contacting the bottom end of rod 17, and is screwed against the rod.

Once column 11 is positioned and clamped, and upon consent by the operator, the processing and control unit then proceeds to position the next column 11.

Once columns 11 are all positioned as described and fitted with respective part supporting tools 12, the configuration of fixture 10 is complete and the part measuring sequence may commence.

The advantages of fixture 10 according to the present invention will be clear from the foregoing description.

Firstly, tool 13 and columns 11 are relatively straightforward in design and cheap to produce, while at the same time providing for the same positioning accuracy as known automatically reconfigurable fixtures. Secondly, fixture 10 may be used on any conventional type measuring machine, even with a nonferromagnetic bed, providing the bed presents the usual anchoring holes. Finally, being fitted positively to bed 2, columns 11 are capable of withstanding relatively severe impact and stress with no loss in positioning accuracy.

Clearly, changes may be made to fixture 10 as described and illustrated herein without, however, departing from the scope of the present invention.

In particular, FIGS. 7 and 8 show two alternative embodiments of the release mechanism of clamping device 16.

The FIG. 7 variation consists simply in replacing lever 78 with a pressure screw 118 acting on head 64 of tie 57, and which is screwed into cover 75 and presents an operating knob 119 at the top.

In the FIG. 8 variation, lever 78 is replaced by a pneumatic operating device 120 housed inside body 14 and comprising a lever 124 pivoting on body 14, and a pneumatic actuator 125 for controlling lever 124.

FIG. 12 shows a variation in the construction of column 11 featuring device 120, whereby column 11 presents pneumostatic pads 126 in place of ball supports 27, and device 18 comprises a pneumatic release actuator 127. All the above pneumatic devices are connected to a single fast-fit supply coupling 128, so that, to move column 11, a compressed air supply line 129 is simply connected to coupling 128 to release column 11 from bed 2, support it pneumostatically, and release rod 17 in one single operation. Once the column and rod are positioned correctly, clamping is effected by simply cutting off the air supply.

Figure 14:
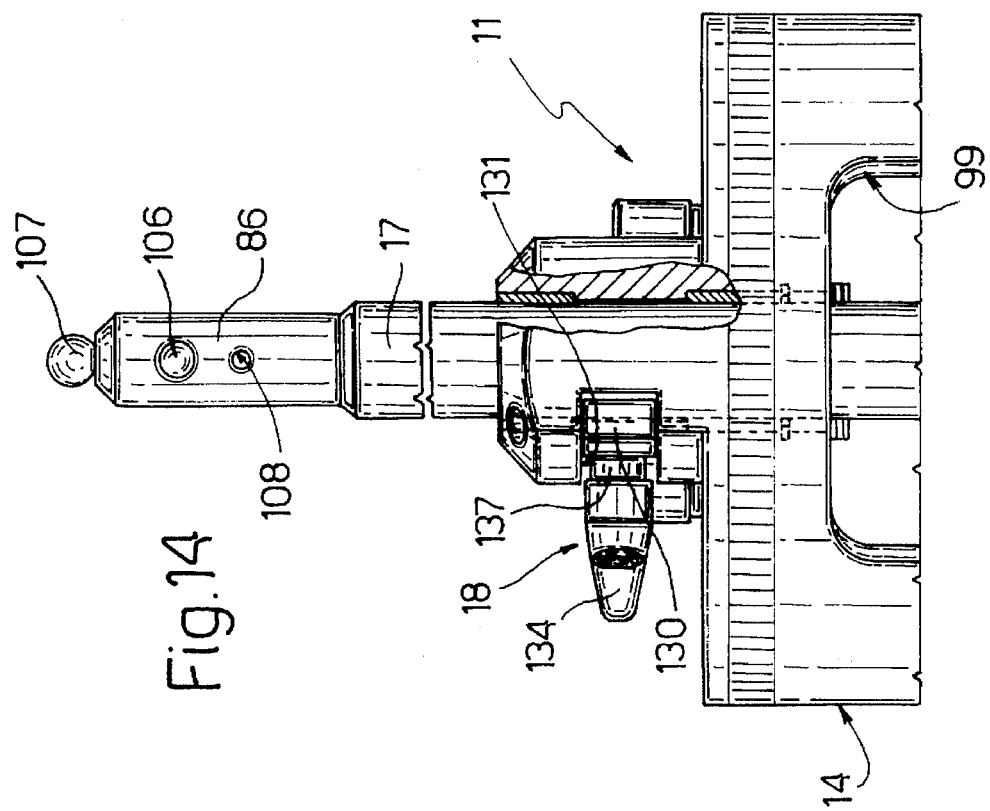
FIG. 14 shows a partially sectioned view of part of the FIG. 13 column element.
Figure 13:
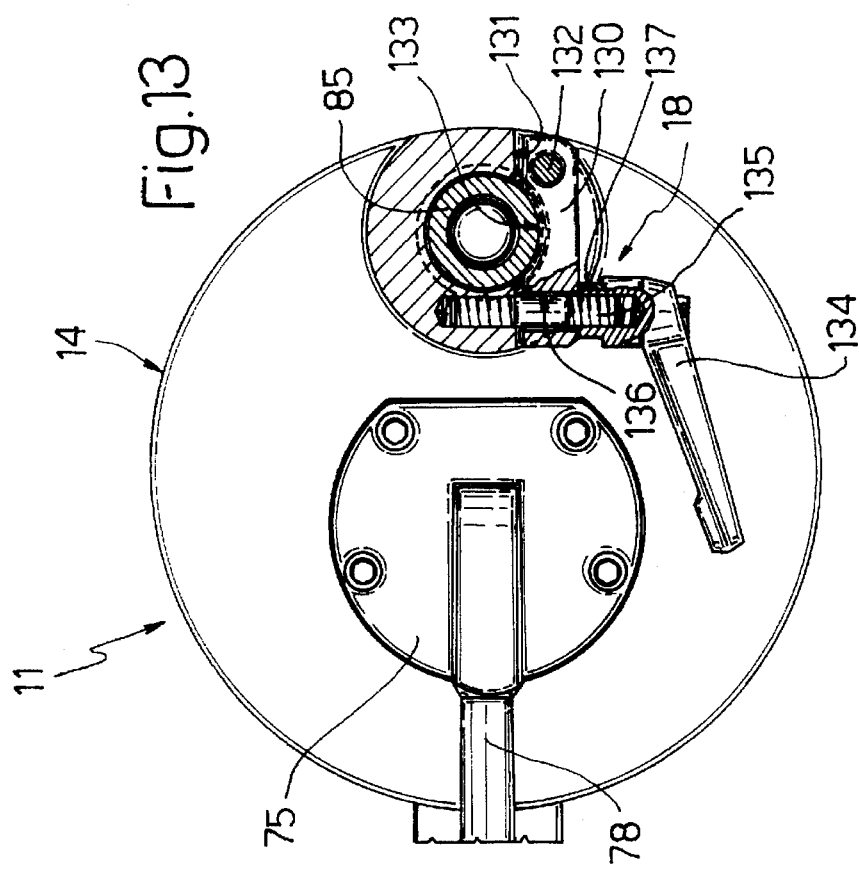
FIG. 13 shows a partially sectioned plan view of a further variation of the FIG. 2 column element.

FIGS. 13 and 14 show a variation of device 18 for clamping rod 17, which device 18 comprises a jaw element 130 housed in a radial seat 131 through sleeve 87 and hinged at one end to sleeve 87 by a vertical pin 132. Jaw element 130 presents a recess 133 cooperating with the surface of and so frictionally locking rod 85. Device 18 also comprises a stud 135 screwed to and projecting tangentially from sleeve 87 so as to engage in radially slack manner a hole 136 formed in the opposite end of jaw element 130 to pin 132. Finally, device 18 comprises a torquing lever 134 presenting a tubular end portion 137 screwed to the end of stud 135 and cooperating axially with jaw element 130 to maintain it contacting rod 85.

With reference to tool 13, light source 115 may be replaced by a number of sources about seat 111a, or by one or more light sources on head 4 of the movable unit.

We claim:

1. A reconfigurable fixture for positioning and supporting parts on a machine, comprising:

a) a reference surface;
b) at least one reconfigurable supporting element positionable on said surface comprising
   i) a first portion; and
   ii) a second portion;
c) reference tool means including a reference tool cooperating with the second portion of the at least one supporting element for defining a three-dimensional position for the second portion with the reference tool and the at least one supporting element in a position of mutual engagement;
d) a moveable unit for moving said reference tool into any one of a plurality positions;
e) clamping means activated with the reference tool and the at least one supporting element in said position of mutual engagement for releasably clamping said first portion to said surface and said second portion to said first portion with the second portion in said three-dimensional position, the clamping means being releasable independent of a position of the reference tool with respect to said at least one supporting element.

2. A fixture as claimed in claim 1, comprising at least one anchoring element for anchoring said supporting element to said surface; said supporting element comprising preliminary connecting means for connecting it to said anchoring element and for permitting continuous adjustment, about said anchoring element, of a position of said first portion of said supporting element on said surface.

3. A fixture as claimed in claim 2, wherein said preliminary connecting means comprise a gib comprising snap-on retaining means cooperating with said anchoring element to define a hinge connection of the gib; said gib being connected in sliding manner to said first portion of said supporting element.

4. A fixture as claimed in claim 3, wherein said anchoring element comprises a mushroom-shaped head; said gib comprising a bottom groove engaged by said head of said anchoring element; and said snap-on retaining means comprising a spring for retaining said head in a predetermined portion of said groove.

5. A fixture as claimed in claim 3, wherein said clamping means comprises first means for clamping said first portion to said surface comprising a vertical tie housed inside said first portion and connectable to said first portion and to said gib so as to transmit to said first portion a clamping force causing it to cooperate frictionally with said surface.

6. A fixture as claimed in claim 5, wherein said first means for clamping said first portion to said surface comprise first elastic means interposed between said tie and said first portion, and which provide for generating said clamping force.

7. A fixture as claimed in claim 6, wherein said supporting element comprises release means for releasing said means for clamping said first portion to said surface.

8. A fixture as claimed in claim 7, wherein said release means comprise a control element acting on said tie in opposition to said first elastic means, for detaching said tie from said gib.

9. A fixture as claimed in claim 1, wherein said supporting element comprises low-friction supporting means interposed between said first portion and said surface.

10. A fixture as claimed in claim 1 wherein said second portion of said supporting element is a rod housed in longitudinally sliding manner inside radial supporting means fitted to said first portion of said supporting element; said first means for clamping said rod in relation to said first portion comprising a hydraulically-expanding bush.

11. A fixture as claimed in claim 1 wherein said supporting element comprises pneumostatic supporting means; first pneumatic means for releasing said first means for clamping said first portion to said surface; second pneumatic means for releasing said second portion from said first portion; and a single coupling for connecting said pneumostatic supporting means and said first and second pneumatic release means to a compressed air supply line.

12. A fixture as claimed in claim 1, wherein said second portion of said supporting element comprises a top end ball stop, and a pair of diametrically opposed radial projections; said reference tool means comprising a V-shaped seat cooperating with said ball stop to define its position vertically and in a direction parallel to said projections and comprising a pair of end forks cooperating with said projections to define the position of said second portion in a direction perpendicular to said projections, and the angular position of said second portion of said supporting element.

13. A fixture as claimed in claim 1, wherein said reference tool comprises sensor means for indicating said position of mutual engagement.

14. A fixture as claimed in claim, 1 wherein said reference tool comprises means for generating at least one light beam for assisting positioning of said supporting element.

15. A reconfigurable fixture as claimed in claim 1 wherein the clamping means is releasable manually.

16. A reconfigurable fixture as claimed in claim 15 wherein the clamping means comprises first means for clamping said first portion to said surface and second means for clamping said second portion to said first portion.

17. A reconfigurable fixture as claimed in claim 6, wherein said supporting element comprises low-friction supporting means interposed between said first portion and said surface.

18. A fixture as claimed in claim 17, wherein said first portion of said supporting element comprises at least one supporting portion by which it rests on said surface; second elastic means being interposed between said first portion of said supporting element and said low-friction supporting means, for generating a supporting force sufficient to maintain said supporting portion raised in relation to said surface under the weight of the supporting element itself, but which is less than said clamping force exerted by said first elastic means.

19. A method of configuring a fixture (10) for positioning and supporting parts on a machine (1), particularly a measuring machine, comprising a reference surface (2a) and a movable unit (3); said fixture (10) comprising at least one reconfigurable supporting element (11) presenting a first portion (14) positionable on said surface (2a), and a second portion (17) positionable in relation to said first portion (14) in a direction (Z) perpendicular to said surface (2a);

said method being characterized in that it comprises a first step wherein a reference tool (13) is positioned by said movable unit (3) in a predetermined position; a second step wherein said first portion (14) of said supporting element (11) is moved manually on said surface, and said second portion (17) of said supporting element (11) is moved manually in relation to said first portion (14), so that said second portion (17) of said supporting element (11) engages three-dimensional reference means (111, 112) of said reference tool (13); and a third step wherein said first portion (14) is clamped to said surface (2a), and said second portion (17) is clamped in relation to said first portion (14) in said engaged position.

20. A method as claimed in claim 19, characterized in that it comprises a preliminary operation wherein an anchoring element (41) is fitted to said surface (2a) in a predetermined position selected from a number of discrete positions (9); said second step comprising the operation of connecting said first portion (14) of said supporting element (11) to said anchoring element (41), and the operation of positioning said supporting element (11) in a portion of said surface (2a) surrounding said anchoring element (41).

21. A method as claimed in claim 19, wherein said second step comprises positioning the supporting element on the surface, and includes generating at least one light beam from the reference tool for assisting the positioning of said supporting element.

* * * * *